United States Patent [19]

Ohira et al.

[11] 4,303,452
[45] Dec. 1, 1981

[54] METHOD OF PRODUCING IMPROVED STARCH BY SMOKING

[75] Inventors: Toshiaki Ohira, Sagamihara; Reiko Miyano, Kawasaki; Ryonosuke Yoshida, Kamakura, all of Japan

[73] Assignee: Ajinomoto Company Incorporated, Tokyo, Japan

[21] Appl. No.: 138,894

[22] Filed: Apr. 10, 1980

[30] Foreign Application Priority Data

Apr. 16, 1979 [JP] Japan ................................. 54-45270
Aug. 6, 1979 [JP] Japan ................................. 54-10006
Jan. 16, 1980 [JP] Japan ................................. 55-3377

[51] Int. Cl.$^3$ ............................................. C13L 1/08
[52] U.S. Cl. ........................................ 127/32; 127/71; 426/314
[58] Field of Search ................... 426/314; 127/32, 71

[56] References Cited

U.S. PATENT DOCUMENTS 2,338,156  1/1944  Allen ................................. 426/314

Primary Examiner—Sidney Marantz
Attorney, Agent, or Firm—Oblon, Fisher, Spivak, McClelland & Maier

[57] ABSTRACT

A method of producing improved starch, which comprises subjecting starch having a water content of not more than 50% to a smoking treatment.

6 Claims, 3 Drawing Figures

METHOD OF PRODUCING IMPROVED STARCH BY SMOKING

BACKGROUND OF THE INVENTION

1. Field of the Invention

The present invention relates to a method of producing an improved starch by smoking. The smoked starch of the present invention has improved properties compared with ordinary starch.

2. Description of the Prior Art

Starch is commonly used for various kinds of foods, e.g., marine paste products, livestock paste products, daily dishes, and confectionery. When cooking foods containing starch, the heat and the presence of water cause the starch to gelatinize. When the gelatinized starch is cooled to room temperature, it gels. In particular, the gel strength decreases dramatically when the starch heated above 100° C. is cooled to room temperature. This property of ordinary starch has restricted the use of starch in foods.

SUMMARY OF THE INVENTION

Accordingly, one object of the present invention is to improve the properties of starch.

Another object of the present invention is to prepare a starch having improved properties after having been heated to a temperature of above 100° C.

Briefly, these objects and other objects of the invention as hereinafter will become more readily apparent can be attained by providing a method of producing improved starch, which comprises, subjecting starch, which has a water content of less than 50%, to a smoking treatment.

DETAILED DESCRIPTION OF THE PREFERRED EMBODIMENTS

Suitable starches which may be used as starting materials in the present invention include all types of starch and mixtures of different types of starches. Suitable starches include ordinary corn starch, waxy corn starch, potato starch, wheat starch, rice starch, and the like. Starch includes also the process product purified or unpurified. Examples of the processed products are pre-gelatinized starch which is gelatinized by heat, thin boiling starch which is immersed in an acid solution, mechanically broken starch, and the like. Two or more types of starch may be used together. Starches having various degrees of diameter may be used. The water content of starch in the present invention is not greater than 50%. In this range the starch is a powder or cake. When the water content is greater than 50%, the smoking efficiency decreases drastically and the smoking treatment of the present invention is not applicable. When the original starch has a water content greater than 50%, it is necessary to adjust a water content to not greater than 50% by filtration, centrifugation, and the like. The starch is then smoked.

The smoking treatment in the present invention is commonly applied to the process of producing livestock products, e.g., ham, sausage, bacon. This treatment improves the flavor and the color of the products and is effective for antisepsis. Examples of the smoking treatment are, as is well known, the cold smoking treatment, the hot smoking treatment, the heat smoking treatment, the roast smoking treatment, and the electric smoking treatment. The smoking time is controlled so as to prevent the heat from changing the starch to dextrin. The preferred smoking time depends primarily on the temperature and the smoking apparatus.

When the starch is smoked at a temperature in the range of from 15° C. to 30° C., the preferable smoking time is in the range of from 2 minutes to 2 hours; the cold smoking treatment. When the starch is smoked at a temperature in the range of from 50° C. to 80° C., the preferable smoking time is in the range of from 30 minutes to 4 hours; the hot smoking treatment. When the starch is smoked at a temperature in the range of from 100° C. to 140° C., the preferable smoking time is in the range of from 2 seconds to 5 minutes.

Other smoking treatments may be used in the present invention, such as the electric smoking treatment which is performed by discharging electricity in the range of from 10000 V to 20000 V as discussed in Shokuryo Daijiten, published by Shinju Shoin.

The preferred smoking condition is:
water content: from 10% to 50%, temperature: from 10° C. to 80° C., time: from 2 minutes to 3 hours.

The more preferred smoking conditions are:

1. water content: from 10% to 20%, temperature: from 10° C. to 50° C., time: from 15 minutes to 3 hours; and
2. water content: from 20% to 50%, temperature: from 30° C. to 80° C., time: from 2 minutes to 2 hours.

Other factors such as smoke source, humidity of the atmosphere, the method of generating smoke, heat transfer and the circulation of gas, are not important factors which influence the quality of the smoked starch.

The other food material, that is, oils, seasonings, polysaccharides and so on, may be added to starch in the range such that the properties of starch are not influenced.

The starch obtained by the smoking treatment of the present invention has improved properties, that is, the smoked starch maintains the viscosity and the gel formation ability when starch is heated and even when the starch is cooled after heating.

The starch obtained by the smoking treatment generally has a pH range of from 3 to 3.5, therefore, the smoked starch is hydrolyzed gradually during long storage by organic acids formed during the smoking and the viscosity of the smoked starch drops. Thus, the pH of the smoked starch is preferably adjusted to a range of from 4 to 7. The methods of adjusting a pH are performed by dipping in an alkali solution, by spraying dilute alkali solution on the starch powder, and the like.

It is more preferable to adjust the pH of the starch before the smoking treatment. The starting starch has a pH of lower than 7, so the pH is adjusted to a range of from 9 to 11 by contacting with alkali. When the pH of the starting starch is adjusted to greater than 11, the starch is alkali-gelatinized, while when the pH of the starting starch is adjusted to that less than 9, the pH of the smoked starch will not be higher than 4. The methods of adjusting the pH of the starting starch are performed by adding alkali to starch slurry, mixing the alkali solution and the starch solution, spraying dilute alkali solution to starch powder, and the like.

The alkali and the alkali solution used as foodstuffs are applicable to the present invention. Examples of alkali are sodium carbonate, sodium bicarbonate, sodium dihydrogenphosphate, disodium hydrogenphosphate, trisodium phosphate, sodium hydroxide, and the potassium salts of these compounds.

By adjusting the pH of the starting starch to a range of from 9 to 11, a smoked starch having a pH of from 4 to 6 can be obtained. This value is similar to that of the ordinary starch.

In order to preserve the smoked starch, the smoked starch is dried and sterilized. Conventional methods of drying may be used such as flash-drying, ventilating-drying, fluidized bed-drying, and the like. The smoked starch is dried to the water content of less than 18%.

The smoked starch forms a gel having a higher gel intensity or strain than that of the ordinary starch at the high temperature of sterilizing or cooking.

Additionally, the high gel intensity or strain at a high temperature does not decrease as much as with ordinary starch even when the gel is cooled to room temperature.

Furthermore, the high gel intensity or strain of the gel of the smoked starch formed at a low temperature is not reduced when the gel is heated, and the smoked starch has good flavor and taste.

Therefore, when the smoked starch is used for various kinds of foods, e.g., marine paste products, livestock paste products, daily dishes, and confectionery, these foods have the desired properties, good flavor and taste.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Having generally described this invention, a further understanding can be obtained by reference to certain specific examples which are provided herein for purposes of illustration only and are not intended to be limiting unless otherwise specified.

EXAMPLE 1

A 500 g amount of a commercial corn starch (water content: 13.0%, average diameter: 20$\mu$) was spread on a stainless steel tray to form a layer of about 2 mm thickness. This tray was put into the smoke house produced by Masuda Sangyo Co., Ltd. The smoke originated from cherry chips. The smoking treatment was performed for 2 hours (dry-bulb temperature: 60° C., web-bulb temperature: 30° C.), product A having a water content of 5.8% was obtained.

Figures 1, 2:
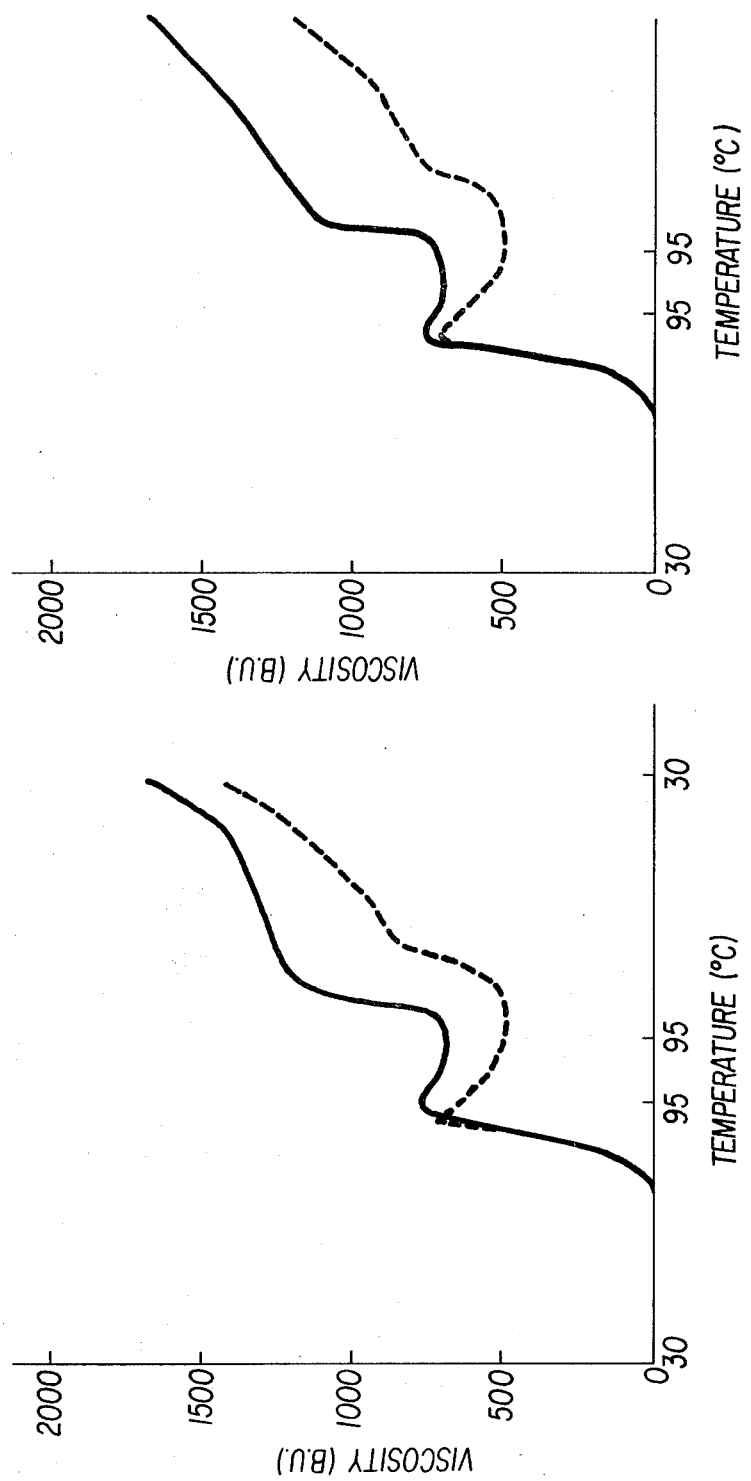
FIGS. 1-3 compare the viscosity of conventional starches with the smoked starches of this invention as a function of there temperature history.

The viscosity of the product A and the commercial corn starch were measured by Amylograph made by Brabender OHG and illustrated in FIG. 1. The full line is for the product A and the broken line is for the commercial corn starch. The slurries having a solid content of 8% were heated to 95° C. from room temperature at the rate of 1.5° C./minute, held at 95° C. for 10 minutes, then cooled to 30° C. at the rate of 1.5° C./minute. The viscosity of the product A did not decrease at high temperature.

EXAMPLE 2

A 500 g amount of a commercial potato starch (water content: 17.8%, average diameter: 40$\mu$) was spread on an aluminum tray to form a layer of about 2 mm thickness. This tray was put into the smoke house, and the smoke orginated from oak chips. The smoke treatment was performed for 3 hours at a temperature of from 50° C. to 60° C., product B having a water content of 5.6% was obtained.

EXAMPLE 3

A 1000 g amount of a commercial potato starch (water content: 13.0%, average diameter: 20$\mu$) was mixed with 2.3 l of water and 166 ml of concentrated hydrochloric acid, and stirred for one hour at room temperature. This mixture was adjusted to a pH of 5.0 with sodium hydroxide solution (concentration 5%), then the corn starch was filtrated and washed with water. The resulting cake was dried by a ventilator at 40° C. to a water content of 12.0%. A thin boiling starch was obtained.

A 500 g amount of the thin boiling starch was smoked by the manner described in Example 2, product C having a water content of 12.0% was obtained.

EXAMPLE 4

This example shows the effect of heating the smoked starch.

The slurries of the samples illustrated in Table I, were adjusted to a solid content of 12% with water. 0.8% of carboxymethyl cellulose ("Celogen 4H") was added to the slurry. After being stirred for 20 minutes, this mixture was packed in four laminate tubes. These tubes were heated at 75° C. for 30 minutes (a), at 85° C. for 30 minutes (b), at 95° C. for 30 minutes (c), and at 120° C. for 25 minutes (d), respectively. The heat treatment at 120° C. for 25 minutes was performed by using the retort sterilization apparatus "Rotomat" made by Hermann Stock in West Germany.

These heated tubes were stored at 5° C. for 12 hours, then the samples in the tubes were gelled. The breaking strength of these samples were measured at 20° C. by using the Rheometer made by Fujirika-kogyo Company in Japan.

| Thickness of Sample | 2 cm |
|---|---|
| Diameter of Attachment | 10 cm |
| Speed of Compression | 0.75 mm/second |

The results are shown in Table I.

TABLE I

| Sample | Heating Condition | | | |
|---|---|---|---|---|
| | a | b | c | d |
| Smoked corn starch (Product A in Example 1) | 60 | 108 | 289 | 122 |
| Commercial corn starch | 60 | 112 | 250 | 102 |
| Smoked potato starch (Product B in Example 2) | 227 | 198 | 170 | 53 |
| Commercial potato starch | 343 | 254 | 184 | 15 |
| Smoked thin boiling starch (Product C in Example 3) | 50 | 95 | 140 | 105 |
| Commercial thin boiling starch | 77 | 130 | 125 | 73 |

The unit is [g/cm$^2$]

EXAMPLE 5

A 500 g amount of a commercial corn starch (water content: 13.0%) was spread on a stainless steel tray to form a layer of about 2 mm thickness, and this tray was put into the smoke house. The smoke originated from cherry chips. The smoke treatment was performed for 30 minutes (dry-bulb temperature: 60° C., wet-bulb temperature: 30° C.). The pH of the smoked starch was 3.4, so this starch was adjusted to the pH set forth in Table II with sodium hydroxide solution (concentration 0.8%), and dried by a ventilator, and slurries having a solid concentration of 8% were prepared. The maximum viscosity of the sample was measured by Amylograph made by Brabender OHG.

The results are shown in Table II.

TABLE II

| Sample No. | pH | Storage Days 0 | 7 | 14 |
|---|---|---|---|---|
| 1 | 3.47 | 770 BU | 755 BU | 725 BU |
| 2 | 3.99 | 780 | 775 | 770 |
| 3 | 5.00 | 785 | 790 | 785 |
| 4 | 6.00 | 785 | 785 | 780 |
| 5 | 6.94 | 810 | 815 | 810 |
| 6 | 7.93 | 860 | 865 | 835 |

EXAMPLE 6

A 900 g amount of the commercial corn starch (water content: 13.0%) was stirred in 1.5 l of water, and was separated to 6 parts. The sodium hydroxide solution (concentration 1 N) was added to each slurry to adjust the pH as set forth in Table III. The alkali cakes having a water content of 47.0% were obtained by filtering the slurry.

Each cake was spread on a stainless steel tray to form a layer of about 5 mm thickness, and this tray was put into the smoke house. The smoke originated from cherry chips. The smoking treatment was performed for 15 minutes (dry-bulb temperature: 30° C., moisture: 10%) products having a water content of 37.8% were obtained, and then dried to a water content of 11.6% by a ventilator.

The slurries having a solid concentration of 8% were prepared with water, and the viscosity of these slurries were measured by Amylograph made by Brabender OHG.

The results are shown in Table III.

TABLE III

| pH Before Smoking | pH After Smoking | Maximum Viscosity (BU) | Remarks |
|---|---|---|---|
| 11.5 | 6.15 | 810 | alkali gelatinized |
| 10.5 | 4.83 | 800 | not gelatinized |
| 10.0 | 4.80 | 780 | not gelatinized |
| 9.5 | 4.13 | 690 | not gelatinized |
| 8.5 | 3.95 | 650 | not gelatinized |
| commercial corn starch | 4.60 | 635 | not gelatinized |

EXAMPLE 7

A 500 g amount of the commercial corn starch (water content: 13.0%) was spread on a stainless steel tray to form a layer of about 5 mm thickness, and this tray was put into the smoke house. The smoke originated from cherry chips. The smoking treatment was performed for 60 minutes (dry-bulb temperature: 30° C., moisture: 10%). The pH of the smoked starch was 3.4 (Product D).

Half of Product D was adjusted to pH 4.5 with sodium hydroxide solution (concentration 0.8%), and then dried to a water content of 14.0% by a ventilator (Product E).

A 700 g amount of the commercial corn starch (water content: 13.0%) was mixed with 100 ml of sodium hydroxide solution (0.2 N), and kneaded by a speedkneader.

An alkali starch having a water content of 25%, and a pH of 9.3 was obtained by filtering the slurry.

This cake was spread on a stainless steel tray to form a layer of about 5 mm thickness, and this tray was put into the smoke house. The smoke originated from cherry chips. The smoking treatment was performed in the same condition mentioned above. A product having a water content of 14.0% and a pH of 4.5 was obtained (Product F).

Figure 3:
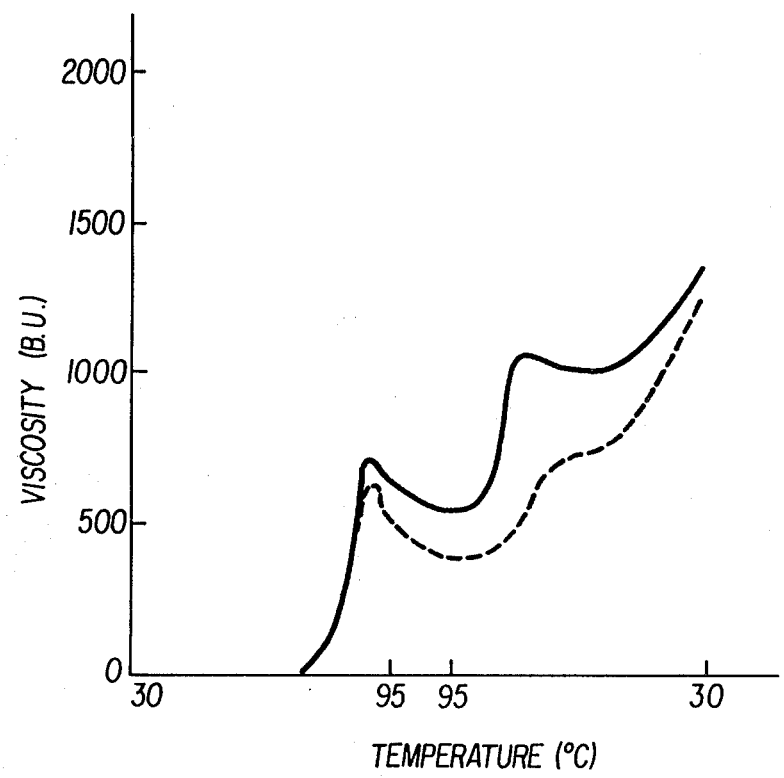

Slurries having a solid concentration of 8% were prepared with water, and the viscosity of these slurries were measured by Amylograph made by Brabender OHG. The amylograms of Products E and F are illustrated in FIGS. 2 and 3, respectively. The full lines in FIGS. 2 and 3 are for Products E and F, respectively, and the broken lines are for the commercial corn starch. The measuring manner was the same manner as described in Example 1. The peak viscosity in the high temperature was defined as the maximum viscosity.

The same measurement was performed after storing these samples for 30 days at 30° C.

The results are shown in Table IV.

TABLE IV

| Sample | Maximum Viscosity (BU) 0 | 30 | Smell 0 | 30 |
|---|---|---|---|---|
| Commercial corn starch | 635 | 635 | None | None |
| Product D | 730 | 710 | Fragrant smoked smell | Smoked smell and sour smell |
| Product E | 730 | 740 | Fragrant smoked smell | Fragrant smoked smell |
| Product F | 730 | 735 | Fragrant smoked smell | Fragrant smoked smell |

EXAMPLE 8

A 1 kg amount of the frozen fish paste was melted at 5° C., and ground for 10 minutes, and then ground for 20 minutes after mixing with 30 g of salt. 200 g of the commercial corn starch, and 400 g of water was added to the ground paste, and then kneaded for 10 minutes. This mixture was then stuffed into a laminate tube (polyvinylidene chloride).

The smoked corn starch (Products D, E and F in Example 7) were substituted for the commercial corn starch, and the above method was followed.

Half of these tubes were heated at 85° C. for 30 minutes and the other half was heated at 121° C. for 25 minutes by using the retort sterilization apparatus "Rotomat" made by Hermann Stock in West Germany.

These heated tubes were stored at 5° C. for 12 hours, then the samples in the tubes were gelled. The physical properties of these samples were measured at 20° C. by using the Rheometer made by Fujirika-kogyo Company in Japan.

| Thickness of Sample | 2 cm |
|---|---|
| Diameter of Attachment | 5 mm |
| Speed of Compression | 0.7 mm/second |
| Chart Speed | 18 cm/minute |

The gel intensity was determined from the fracture strength, and the gel strain was the distance on the chart from the beginning to the fracture.

The sensory evaluation was performed by ten persons.

This scale ranged from 0 to 10, with 10 being the best. The standard sample for comparison was the sample produced from the commercial corn starch, which was given a value of 5.0.

The results are shown in Table V.

TABLE V

| Heating Condition | Item | Commercial Corn Starch | Product D | Product E | Product F |
|---|---|---|---|---|---|
| 85° C. | Gel intensity (g/cm²) | 860 | 875 | 880 | 875 |
|  | Gel strain (mm) | 29.0 | 29.5 | 29.5 | 29.5 |
| 30 min. | Sensory evaluation | 5.0 | 7.5 | 7.5 | 8.0 |
| 121° C. | Gel intensity (g/cm²) | 550 | 635 | 650 | 650 |
|  | Gel strain (mm) | 26.0 | 28.0 | 28.5 | 28.5 |
| 25 min. | Sensory evaluation | 5.0 | 8.0 | 7.5 | 8.5 |

EXAMPLE 9

A 1 kg of the frozen fish paste was melted at 0° C., minced to a size of about 5 mm, ground for 3 minutes by food cutter. Then 29.3 g of salt and 1.7 g of sodium polyphosphate were added and the mixture was ground for 5 minutes. 310 g of ice water, 172 g of lard, 35 g of wheat gluten, 3.4 g of potassium sorbate, 8.6 g of the seasonings, and 172 g of the commercial corn starch were added, and the mixture was ground for 3 minutes. The minced mixture was stuffed into the laminate tube (polyvinylidene chloride) having a diameter of 30 mm.

The smoked corn starches (Products D, E and F of Example 7) were substituted for the commercial corn starch, and the above method was followed.

These tubes were heated at 122° C. by using the retort sterilization apparatus "Rotomat" made by Hermann Stock in West Germany.

These heated tubes were stored at 5° C. for 12 hours. The physical properties were obtained, and the sensory evaluation was performed by the same manner described in Example 8.

The results are shown in Table VI.

TABLE VI

|  | Commercial Corn Starch | Product D | Product E | Product F |
|---|---|---|---|---|
| Gel intensity (g/cm²) | 800 | 929 | 930 | 935 |
| Gel strain (mm) | 69.5 | 72.1 | 73.0 | 73.2 |
| Sensory evaluation | 5.0 | 8.0 | 7.5 | 8.5 |

EXAMPLE 10

A 600 g amount of minced meat, 50 g of bread crumb, 250 g of onion, 40 g of the commercial corn starch, and 60 g of the seasonings are mixed and kneaded sufficiently. This material was shaped and steamed for 5 minutes by a steaming basket. Then it was stuffed into the retort pouch and sealed by heat.

The smoked corn starches (Products D, E and F) were substituted for the commercial corn starch and the above method was followed.

These sealed materials were heated at 121° C. for 20 minutes by using the retort sterilization apparatus "Rotomat" made by Hermann Stock of West Germany.

The physical properties of these samples were measured by the plastmeter made by Brabender OHG before and after the retort treatment. The sensory evaluation was performed by the same manner as described in Example 8.

The results are shown in Table VII.

TABLE VII

| Sample | Before Retort Treatment | After Retort Treatment | Sensory Evaluation |
|---|---|---|---|
| Commercial Corn Starch | 55.0 | 43.2 | 5.0 |
| Product D | 54.3 | 51.2 | 8.5 |
| Product E | 54.8 | 52.0 | 8.5 |
| Product F | 55.0 | 52.8 | 8.0 |

The numbers of the physical properties mean the torque and its unit is [m-g].

EXAMPLE 11

The commercial corn maize (white dent corn) was classified to the soluble part, the germ part, the hush part, the gluten part, and the starch slurry by using sulfurous acid-water solution (wet method). The starch slurry having a solid content of 36% was filtered under reduced pressure. The resulting cake was sifted through 28 mesh sieve to produce the granule corn starch having an average diameter of 500 micron.

A 160 g amount of this material was spread on a stainless steel tray to form a layer of about 2 mm thickness, and this tray was put into the smoke house. The smoke originated from cherry chips. The smoking treatment was performed for 4 hours (dry-bulb temperature: 40° C., wet-bulb temperature: 20° C.) and a product having a water content of 32.8% and a pH of 3.5 was obtained (Product G).

The half of Product G was adjusted to pH 4.5 with sodium hydroxide solution (concentration 0.8%) and dried to a water content of 11.8% (Product H).

A 3 l amount of the slurry of the above corn starch was adjusted to pH 10.0 with sodium hydroxide solution (concentration 1 N), and filtered to obtain the cake having a water content of 47%. This cake was smoked by the manner described above, and the cake was dried to prepare the product having a water content of 12.0% and a pH of 4.28 was obtained (Product I).

The maximum viscosity was measured by the same manner as Example 7.

The results are shown in Table VIII.

TABLE VIII

| Sample | Maximum Viscosity (B.U.) | Smell |
|---|---|---|
| Granule Corn Starch | 660 | None |
| Product G | 790 | Fragrant smoked smell |
| Product H | 800 | Weak fragrant smoked smell |
| Product I | 810 | Fragrant smoked smell |

EXAMPLE 12

A 700 g amount of a commercial corn starch produced from the waxy maize (water content: 14.1%, pH: 4.15) was spread on a stainless steel tray to form a layer of about 5 mm thickness. This tray was put into the smoke house. The smoke originated from cherry chips. The smoking treatment was performed for 30 minutes at 30° C. This smoked starch (pH: 3.43) was mixed with 1 l of water, and adjusted to the pH 4.5 with sodium hydroxide solution (concentration 0.8%). This slurry was dried by a ventilator, and a smoked waxy corn starch having a water content of 12.0% was obtained. The slurries of the waxy corn starch having a solid content of 6% were prepared, and the amylograms of these slurries were measured by the manner described in Example 1.

The results are shown in Table IX.

TABLE IX

| Sample | Maximum Viscosity (BU) | Cooled Viscosity* (BU) |
|---|---|---|
| Smoked waxy corn starch | 935 | 1095 |
| Waxy corn starch | 710 | 445 |

* The cooled viscosity means the final viscosity measured by the manner described in Example 1.

These samples were added to a soup of boiled vegetables and fruit at a ratio of 3% (solid content: 23 g/dl). This soup was heated at 95° C. for 10 minutes, and cooled, and then adjusted to pH 3.5 with vinegar. Spice (1%) and caramel (1.5%) were added. The viscosity of the obtained sauce was measured by the Brookfield type visco-meter.

The results are shown in Table X.

TABLE X

| Sample | Viscosity at 25° C. | Viscosity at 5° C. after 1 day | Viscosity at 5° C. after 100 days |
|---|---|---|---|
| Smoked waxy corn starch | 850 c.p. | 1050 c.p. | 1020 c.p. |
| Waxy corn starch | 230 c.p. | 420 c.p. | 410 c.p. |

The source from the smoked waxy corn starch has better body than that of the waxy corn starch.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of producing a smoked starch, which comprises:
    a. preparing a starch having a water content of not greater than 50%, and a pH in the range of from 9 to 11; and
    b. subjecting said starch to a smoking treatment.

2. A method of producing a smoked starch, which comprises:
    a. subjecting starch having a water content of not more than 50% to a smoking treatment; and
    b. adjusting the pH of said smoked starch to the range of from 4 to 7.

3. The method of claim 1 or 2, wherein the water content of said starch is in the range of from 10% to 50%, the smoking temperature is in the range of from 10° C. to 80° C., and the duration of said smoking treatment is in the range of from 2 minutes to 3 hours.

4. The method of claim 1 or 2, wherein the water content of said starch is in the range of from 10% to 20%, the smoking temperature is in the range of from 10° C. to 50° C., and the duration of said smoking treatment is in the range of from 15 minutes for 3 hours.

5. The method of claim 1 or 2, wherein the water content of said starch is in the range of from 20% to 50%, the smokin temperature is in the range of from 30° C. to 80° C., and the duration of said smoking treatment is in the range of from 2 minutes to 2 hours.

6. The smoked starch prepared by the process of claim 1 or 2.

* * * * *

UNITED STATES PATENT AND TRADEMARK OFFICE
CERTIFICATE OF CORRECTION

PATENT NO. : 4,303,452
DATED : Dec. 1, 1981
INVENTOR(S) : Toshiaki Ohira, et. al.

It is certified that error appears in the above—identified patent and that said Letters Patent is hereby corrected as shown below:

Please correct the Priority Data to read as follows:

[30]---Foreign Application Priority Data

Apr. 16, 1979 [JP]   Japan...............54-45270

Aug.  6, 1979 [JP]   Japan...............54-100061

Jan. 16, 1980 [JP]   Japan...............55-3377

Signed and Sealed this

Twenty-third Day of February 1982

[SEAL]

*Attest:*

GERALD J. MOSSINGHOFF

*Attesting Officer*     *Commissioner of Patents and Trademarks*